US011280589B2

(12) United States Patent
Cummins et al.

(10) Patent No.: US 11,280,589 B2
(45) Date of Patent: Mar. 22, 2022

(54) COMPOSITE PANELS USEFULLY EMPLOYED IN ANTI-BALLISTIC PRODUCTS AND METHODS TO MAKE THE SAME

(71) Applicant: DSM IP ASSETS B.V., Heerlen (NL)

(72) Inventors: David Michael Cummins, Echt (NL); Dietrich Wienke, Echt (NL); Roelof Marissen, Echt (NL); Koen Van Putten, Echt (NL); Joke Hendrix, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 1541 days.

(21) Appl. No.: 14/384,004

(22) PCT Filed: Mar. 7, 2013

(86) PCT No.: PCT/EP2013/054575
§ 371 (c)(1),
(2) Date: Sep. 9, 2014

(87) PCT Pub. No.: WO2013/131996
PCT Pub. Date: Sep. 12, 2013

(65) Prior Publication Data
US 2015/0033936 A1    Feb. 5, 2015

(30) Foreign Application Priority Data
Mar. 9, 2012  (EP) ..................... 12158814

(51) Int. Cl.
| F41H 5/04 | (2006.01) |
| B32B 5/02 | (2006.01) |
| B32B 27/02 | (2006.01) |
| B32B 27/12 | (2006.01) |
| B32B 37/06 | (2006.01) |
| B32B 37/10 | (2006.01) |
| F41H 5/02 | (2006.01) |
| F41H 5/24 | (2006.01) |
| F41H 7/00 | (2006.01) |

(52) U.S. Cl.
CPC ............ *F41H 5/0478* (2013.01); *B32B 5/02* (2013.01); *B32B 27/02* (2013.01); *B32B 27/12* (2013.01); *B32B 37/06* (2013.01); *B32B 37/10* (2013.01); *F41H 5/02* (2013.01); *F41H 5/24* (2013.01); *F41H 7/00* (2013.01); *Y10T 428/24091* (2015.01); *Y10T 428/24132* (2015.01); *Y10T 428/24942* (2015.01)

(58) Field of Classification Search
CPC ........ B32B 27/02; B32B 27/12; B32B 37/06; B32B 37/10; B32B 5/02; F41H 5/02; F41H 5/0478; F41H 5/24; F41H 7/00; Y10T 428/24091; Y10T 428/24132; Y10T 428/24942
See application file for complete search history.

(56) References Cited

U.S. PATENT DOCUMENTS

| 5,091,133 A | 2/1992 | Kobayashi et al. | |
| 5,861,202 A * | 1/1999 | Kimura ................... | B32B 5/022 |
| | | | 428/105 |
| 6,803,415 B1 * | 10/2004 | Mikielski ............ | C08L 23/0815 |
| | | | 525/191 |
| 8,236,878 B2 * | 8/2012 | Lewtas .................. | B32B 27/32 |
| | | | 523/351 |
| 9,757,927 B2 * | 9/2017 | Wienke .................. | B32B 27/32 |
| 2002/0034624 A1 * | 3/2002 | Harpell .................... | D04H 3/04 |
| | | | 428/298.1 |

FOREIGN PATENT DOCUMENTS

| EP | 0 269 151 | 6/1986 |
| EP | 0 205 960 | 12/1986 |
| EP | 0 504 954 | 9/1992 |
| GB | 2 042 414 | 9/1980 |
| GB | 2 051 667 | 1/1981 |
| WO | WO 01/73173 | 10/2001 |
| WO | WO 2005/066401 | 7/2005 |

(Continued)

OTHER PUBLICATIONS

Datasheet of Kraton G1657MS (from www.materialdatacenter.com) (Year: 1999).*
https://www.exxonmobilchemical.com/en/products/polyethylene/plastomers?utm_source=google&utm_medium=cpc&utm_campaign=pe_general_none&ds_k=plastomer&gclid=Cj0KCQjw38-DBhDpARIsADJ3kjk3R3942PYC-3WB9t_aWdiVZOhyklJTv2O-uHNG2-0tCecVyqaKRTgaAoO3EALw_wcB&gclsrc=aw.ds#productlist (Year: 2003).*
https://www.exxonmobilchemical.com/en/products/polyethylene/plastomers (Year: 2003).*

(Continued)

*Primary Examiner* — Arti Singh-Pandey
(74) *Attorney, Agent, or Firm* — Nixon & Vanderhye P.C.

(57) ABSTRACT

Composite panel comprising at least one layer containing at least one tape comprising a thermoplastic polymer selected from the group consisting of polyolefins, polyesters, polyvinyl alcohols, polyacrylonitriles, polyamides or polyketone, wherein the tape has a tensile strength of at least 1.2 GPa and an areal density of between 5 and 150 g/m$^2$, and an adhesive in contact with said layer, whereby the amount of the adhesive in contact with one side of the at least one layer is between 0.2 and 15 g/m$^2$, wherein the adhesive is a plastomer wherein said plastomer is a random copolymer of ethylene or propylene and one or more $C_2$ to $C_{12}$ a-olefin co-monomers and wherein said plastomer has a density as measured according to 1801183 of between 860 and 930 kg/m$^3$. In a preferred embodiment the tape comprises an ultra high molecular weight polyethylene. The composite panel is used in a ballistic resistant article.

18 Claims, No Drawings

(56) References Cited

FOREIGN PATENT DOCUMENTS

| WO | WO 2009/056286 | 5/2009 |
|----|----------------|--------|
| WO | WO 2009/108498 | 9/2009 |
| WO | WO 2010/066819 | 6/2010 |
| WO | WO 2010/090627 | 8/2010 |

OTHER PUBLICATIONS https://exxonmobilchemical.ulprospector.com/search.aspx?l=58933&QM=40%3A817&title=Product-Datasheets-for-Exact%u2122-plastomers&CULTURE=en&RBFLT=86044:1 (Year: 2003).*
International Search Report for PCT/EP2013/054575, dated Feb. 2, 2013.

* cited by examiner

COMPOSITE PANELS USEFULLY EMPLOYED IN ANTI-BALLISTIC PRODUCTS AND METHODS TO MAKE THE SAME

This application is the U.S. national phase of International Application No. PCT/EP2013/054575, filed on Mar. 7, 2013, which designated the U.S. and claims priority EP Application No. 12158814.9, filed on Mar. 9, 2012, the entire contents of each of which are hereby incorporated by reference.

The invention relates to a composite panel comprising at least one layer containing at least one tape comprising a thermoplastic polymer selected from the group consisting of polyolefins, polyesters, polyvinyl alcohols, polyacrylonitriles, polyamides or polyketone, wherein the tape has a tensile strength of at least 1.2 GPa and an areal density of between 5 and 250 g/m², and an adhesive in contact with said layer, whereby the amount of the adhesive in contact with one side of the at least one layer is between 0.2 and 15 g/m². The invention further relates to a process to manufacture said composite panels. The invention also relates to sheets and composite tapes suitable to be used in the manufacture of the composite panels.

Such composite panels are known from EP 2379324 A2. This publication discloses ballistic-resistant panels comprising a plurality of bonded, interleaved and angularly disposed layers of polyethylene tape, including a layer of adhesive in contact with said layers of tape. The adhesive in contact with the layers of tape disclosed in EP 2379324 A2 are polyamide, ethyl vinyl acetate, polyethylene, polyurethane and polystyrene-isoprene block copolymers.

Although the ballistic resistant panels according to EP 2379324 show satisfactory performance, this performance can be improved further.

The object of the present invention is to provide a composite panel with optimized antiballistic resistant properties. Properties that may be improved are e.g. energy absorption and panel delamination and especially the balance thereof.

This objective is achieved according to the invention by providing that the adhesive is a plastomer wherein said plastomer is a random copolymer of ethylene or propylene and one or more $C_2$ to $C_{12}$ α-olefin co-monomers and wherein said plastomer has a density as measured according to ISO1183 of between 860 and 930 kg/m³.

The composite panel of the invention comprises at least one layer containing at least one tape, preferably a plurality of stacked layers each containing at least one tape. By plurality of layers is herein understood layers in a number chosen to yield a desired protection level. The number of layers in the panel is typically between 2 and 500, whereas it is preferred that the panel comprises at least 2, preferably at least 4, more preferably at least 8 layers each layer containing at least one tape.

The areal density of the panel of preferably at least 0.25 Kg/m², more preferably of at least 0.5 Kg/m², more preferably of at least 1 Kg/m², most preferably of at least 2 Kg/m². Preferably said total areal density is at most 250 Kg/m², more preferably at most 100 Kg/m², even more preferably at most 75 Kg/m², most preferably at most 50 Kg/m². Preferably, the total areal density of said panel is between 0.25 Kg/m² and 250 kg/m², preferably between 0.5 Kg/m² and 100 Kg/m², more preferably between 1 Kg/m² and 75 Kg/m² and most preferably between 2 Kg/m² and 50 Kg/m². By areal density of the panel is herein understood the weight per square meter of said panel.

By tape is herein understood an elongated body having a length dimension, a width dimension and a thickness dimension, wherein the length dimension of the tape is at least about the same as its width dimension but preferably greater than its width dimension, and wherein said length dimension is much greater than its thickness dimension. Preferably, the term tape also comprises the embodiments of a ribbon, a strip, a film and may have a continuous or a discontinuous length with a regular or an irregular cross-section. In a preferred embodiment, the width dimension of the tape is much greater than its thickness dimension. Preferably the ratio of width to thickness is at least 10, more preferably at least 50, even more preferably at least 10, and most preferably at least 500.

In a preferred embodiment, the tape present in the panel of the invention is anisotropic. By anisotropic is meant in the context of the present application that two mutually perpendicular directions can be defined in the plane of the tape for which the modulus of elasticity in a first direction is at least 3 times higher than the modulus of elasticity in the direction perpendicular to it. Generally said first direction of the preferably anisotropic polymeric film layers is in the art also referred to as machine direction or drawing direction (or as direction of orientation) having the highest mechanical properties.

In a preferred embodiment, at least part of the layers contained by the panel of the invention comprise a single tape having a length and a width about the same as the length and width of the panel. Hereinafter, for the purpose of this embodiment such a tape is referred to as film. The dimensions of width and length of the film are thus dependant on the dimensions of the panel of the invention, which in turn are dependant on its application. The skilled person can routinely determine the lateral dimensions of said film. Preferably said film is anisotropic. Very good results may be obtained when the layers containing the film are stacked such that the directions of orientation, i.e. the machine directions, of the films in two adjacent monolayers is under an angle α of preferably between 45 and 135°, more preferably between 65 and 115° and most preferably between 80 and 100°. A method of preparing such anisotropic films is disclosed for example in WO2010/066819, which is incorporated herein by reference.

In another preferred embodiment, at least part of the layers contained in the panel of the invention comprise each a plurality of tapes. More preferably all layers contained in the panel of the invention comprise each a plurality of tapes. Preferably, the tapes forming said plurality of tapes have a width of between 20 mm and 200 mm, more preferably between 50 mm and 150 mm, most preferably between 80 mm and 120 mm.

In a preferred embodiment, the tapes of the plurality of tapes in a layer are woven into a woven layer. Preferred woven structures are plain weaves, basket weaves, satin weaves and crow-foot weaves. Most preferred woven structure is a plain weave. Preferably, the thickness of the woven layer is between 1.5 times the thickness of a tape and 3 times the thickness of a tape, more preferably about 2 times the thickness of a tape.

In an alternative embodiment of the invention, the tapes of the plurality of tapes in a layer are unidirectional aligned. Preferably, in a layer containing unidirectional aligned tapes at least 70 mass % of the total mass of tapes in said layer, more preferably at least 90 mass %, most preferably about 100 mass %, run along a common direction. Preferably, the direction of orientation of the tapes in a layer comprising unidirectional aligned tapes is at an angle β to the direction of orientation of the tapes in an adjacent layer, whereby β is preferably between 5 and 90°, more preferably between 45 and 90° and most preferably between 75 and 90°.

In the context of the present invention, the tape comprises a thermoplastic polymer that is selected from the group consisting of polyolefins e.g. polyethylene, polyesters, polyvinyl alcohols, polyacrylonitriles, polyamides or polyketone. Suitable polyamides are, for example, the aliphatic polyamides PA-6, PA-6,6, PA-9, PA-11, PA-4,6, PA-4,10 and copolyamides thereof and semi-aromatic polyamides based on for example PA-6 or PA-6,6 and aromatic dicarboxylic acids and aliphatic diamines, for example isophthalic acid and terephthalic acid and hexanediamine, for example PA-4T, PA-6/6, T, PA-6,6/6, T, PA-6,6/6/6, T and PA-6,6/6, I/6, T. Preferably PA-6, PA-6,6 and PA-4,6 are chosen. Furthermore, also polyamide blends are suitable.

Suitable thermoplastic polyesters are, for example, poly (alkylene terephthalate)s, like polybutyleneterephthalate (PBT), polytrimethyleneterephthalate (PTT), polyethyleneterephthalate (PET), polycyclohexanedimethyleneterephthalate (PCT), and poly(alkylene naphthanate)s, like polyethylenenaphthanate (PEN), and copolymers and mixtures.

Preferably the tape of the present invention comprises a polyolefin, more preferably a polyethylene and most preferably an ultra high molecular weight polyethylene.

Particularly preferred are panels according to the invention whereby the polymer in the tape comprises ultra high molecular weight polyethylene or polyamide. These polymers yield the best antiballistic performance.

The ultra high molecular weight polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene. Intrinsic viscosity is a measure for molecular weight that can more easily be determined than actual molar mass parameters like Mn and Mw.

The tapes present in the panel according to the invention may be prepared in a number of ways.

A preferred method for the production of the tapes comprises feeding a polymeric powder between a combination of endless belts, compression-moulding the polymeric powder at a temperature below the melting point thereof and rolling the resultant compression-moulded polymer followed by drawing. Such a method is for instance described in U.S. Pat. No. 5,091,133, which is incorporated herein by reference. If desired, prior to feeding and compression-moulding the polymer powder, the polymer powder may be mixed with a suitable liquid organic compound having a boiling point higher than the melting point of said polymer. Compression moulding may also be carried out by temporarily retaining the polymer powder between the endless belts while conveying them. This may for instance be done by providing pressing platens and/or rollers in connection with the endless belts.

Another preferred method for the production of the tapes comprises feeding a polymer to an extruder, extruding a tape at a temperature above the melting point thereof and drawing the extruded polymer tape below its melting temperature. If desired, prior to feeding the polymer to the extruder, the polymer may be mixed with a suitable liquid organic compound, for instance to form a gel, such as is preferably the case when using ultra high molecular weight polyethylene.

In yet another preferred method the tapes are prepared by a gel process. A suitable gel spinning process is described in for example GB-A-2042414, GB-A-2051667, EP 0205960 A and WO 01/73173 A1, and in "Advanced Fibre Spinning Technology", Ed. T. Nakajima, Woodhead Publ. Ltd (1994), ISBN 185573 182 7. In short, the gel spinning process comprises preparing a solution of a polymer of high intrinsic viscosity, extruding the solution into a tape at a temperature above the dissolving temperature, cooling down the film below the gelling temperature, thereby at least partly gelling the tape, and drawing the tape before, during and/or after at least partial removal of the solvent.

In the described methods to prepare tapes, the drawing, preferably uniaxial drawing, of the produced tape may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene tapes, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength tapes, whereby for tapes of ultra high molecular weight polyethylene, strengths of 1.5 GPa to 1.8 GPa and more may be obtained.

Yet another preferred method for the preparation of the tapes comprises mechanical fusing of unidirectional oriented fibers under a combination of pressure, temperature and time. Such a tape and a method to prepare such a tape are described in EP2205928, which is incorporated herein by reference. Preferably the unidirectional oriented fibers comprise ultra high molecular weight polyethylene (UHMWPE). UHMWPE fibres consisting of polyethylene filaments that have been prepared by a gel spinning process, such as described, for example, in GB 2042414 A or WO 01/73173 A1, are preferably used. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during and/or after the removal of the solvent. A UHMWPE tape prepared by mechanical fusing of fibers yields particularly good antiballistic properties.

The areal density of the tapes can in principle be selected within a wide range. However the areal density of the tape does not exceed 250 g/m$^2$, more preferably does not exceed 100 g/m$^2$, even more preferably does not exceed 50 g/m$^2$ and most preferably does not exceed 30 g/m$^2$. For practical reasons such areal density will preferably be at least 5 g/m$^2$, more preferably at least 10 g/m$^2$. Particularly good antiballistic performance is achieved if the areal density of substantially all tapes, preferably each tape, does not exceed 250 g/m$^2$, more preferably does not exceed 100 g/m$^2$, and most preferably does not exceed 30 g/m². By limiting the thickness of the tape in the panel to the claimed thickness, sufficient antiballistic performance is surprisingly achieved even with tapes having rather limited strengths.

The strength of the tapes largely depends on the polymer from which they are produced, on their production process, and on their, preferably uniaxial stretch ratio. The strength of a tape is at least 1.2 GPa, preferably at least 1.5 GPa, even more preferably at least 1.8 GPa, even more preferably at least 2.1 GPa, and most preferably at least 3 GPa.

The composite panel according to the invention comprises an adhesive in contact with the at least one layer containing the at least one tape. The adhesive is a plastomer wherein said plastomer is a random copolymer of ethylene or propylene and one or more $C_2$ to $C_{12}$ α-olefin co-monomers and wherein said plastomer has a density as measured according to ISO1183 of between 860 and 930 kg/m³, more preferably the density of the copolymer is between 865 and 920 kg/m³, most preferably between 870 and 910 kg/m³. By limiting the plastomer in the panel to the claimed density, also low delamination of the panel could be achieved with limited amounts of the plastomer.

In a preferred embodiment, the plastomer is a semi-cristalline thermoplastic copolymer of ethylene or propylene and containing as co-monomers one or more α-olefins having 2-12 C-atoms, in particular ethylene, isobutene, 1-butene, 1-hexene, 4-methyl-1-pentene and 1-octene. When ethylene with one or more $C_4$-$C_{12}$ α-olefin monomers as co-monomers is applied, the amount of co-monomer in the copolymer usually is lying between 1 and 50 wt. %, and preferably between 5 and 35 wt. %. In case of ethylene copolymers, the preferred co-monomer is 1-octene, said co-monomer being in an amount of between 5 wt % and 25 wt %, more preferably between 10 wt % and 20 wt %. In case of propylene copolymers, the amount of co-monomers and in particular of ethylene co-monomers, usually is lying between 1 en 50 wt. %, and preferably between 2 and 35 wt %, more preferably between 5 and 20 wt. %.

Other plastomers suitable for use in accordance with the invention are those described U.S. Pat. No. 5,994,242 (columns 2-4), incorporated herein by reference.

Preferably the plastomer used according to the invention has a DSC peak melting point as measured according to ASTM D3418 of between 65° C. and 120° C., preferably between 70° C. and 100° C., more preferably between 75° C. and 95° C.

A plastomer manufactured by a single site catalyst polymerization process and in particular a metallocene plastomer is distinguished from ethylene and propylene copolymers that have been manufactured with other polymerization techniques, e.g. Ziegler-Natta catalyst, by its specific density. Said plastomer also differentiates itself by a narrow molecular weight distribution, Mw/Mn, the values thereof preferably being between 1.5 en 3 and by a limited amount of long chain branching. The number of long chain branches preferably amounts at most 3 per 1000 C-atoms. By long chain branches is herein understood ramifications of the polymeric chains with lengths substantially higher than the branches present in the plastomer but stemming from the employed co-monomer. Long chain branches will have typical length of at least 10 C-atoms, more preferably at least 20 C-atoms. Suitable plastomers that may be used in the sheet of the invention and obtained with the metallocene catalyst type are manufactured on a commercial scale, e.g by Exxon, Mitsui, DEX-Plastomers and DOW under brand names as Exact®, Tafmer®, Exceed®, Engage®, Affinity®, Vistamaxx® and Versify®. A description of plastomers and in particular of metallocene plastomers as well as an overview of their mechanical and physical properties can be found for instance in Chapter 7.2 of "*Handbook of polypropylene and polypropylene composites*" edited by Harutun G. Karian (ISBN 0-8247-4064-5) and more in particular in subchapters 7.2.1; 7.2.2; and 7.2.5 to 7.2.7 thereof, which are included herein by reference.

The plastomer used in the panel of the invention may also contain various fillers and additives added thereof. Examples of fillers include reinforcing and non-reinforcing materials, e.g. carbon black, calcium carbonate, clay, silica, mica, talc, and glass. Examples of additives include stabilizers, e.g. UV stabilizers, pigments, antioxidants, flame retardants and the like.

The amount of the plastomer in contact with one side of the at least one layer is between 0.2 and 15 g/m², more preferably between 0.5 and 10 g/m² and most preferred between 1 and 7 g/m². By limiting the amount of adhesive in the panel to the claimed levels, surprisingly sufficient anti-ballistic performance is achieved without substantially increasing the total areal density of the panels.

Whereas the amount of plastomer is expressed as being in contact with one side of the at least one layer, it should be understood that said amount of plastomer may also be in contact with a second, adjacent, layer and consequently each individual layer may be in contact with the specified amount of plastomer on either of its sides. Nevertheless, in view of the stacked nature of the panel of the invention, for each of said at least one layers, the specified amount of plastomer will be present. Hence, an alternative way of expressing the amount of the plastomer per layer is that the amount of the plastomer is between 0.2 and 15 grams per square meter of said layer.

In a preferred embodiment, the plastomer is inhomogeneously, i.e. not homogeneously, spread over said layer. In other words, the plastomer in contact with said layer may not form a plastomer film of homogeneous thickness, but may show areas with lower amounts of plastomer and areas with higher amounts of plastomer. In a yet preferred embodiment, the plastomer is heterogeneously distributed over said layer. Herein is understood that the plastomer in contact with said layer is present in discrete areas, forming plastomer domains or web like structures, leaving areas of the layer without any plastomer. Said inhomogeneity and heterogeneity of the plastomer may be the result of the method the plastomer has been applied during the panel production process. It was surprisingly observed that by an at least partly inhomogeneous distribution of the plastomer throughout the layers of the composite panel, the anti-ballistic properties of the panel could further be improved.

By the amount of plastomer in contact with one side of a layer is herein understood the averaged amount of adhesive, calculated by dividing the amount of plastomer in contact with one side of a specific layer in grams by the surface of said layer of the panel in m².

In a preferred embodiment of the present invention, the total amount of plastomer in the panel is less than 15 wt %, preferably less than 12 wt %, more preferably less than 10 wt %, even more preferably less than 8 wt %, most preferably less than 6 wt %, wherein wt % is the weight of the plastomer in the panel divided by the total weight of the panel. It was surprisingly observed that reducing the amount of plastomer in the panel to the mentioned levels may reduce the total areal density of the panel without negatively impacting its antiballistic properties.

It was noticed by the present inventors that the anti-ballistic properties of the panel are harnessed more efficiently than hitherto, in that the panel of the invention has improved properties over known panels. In particular it was observed that the panel of the invention has optimized ballistic protection. More in particular it was observed that the panel of the invention shows a synergistic effect of improved resistance to delamination while the high energy absorption ($E_{abs}$) is maintained. Whereas panels comprising alternative adhesives, e.g. the ones cited in the prior art document EP 2379324 A2, show also improved back face deformation, this improvement comes at the detriment of $E_{abs}$. The present inventors surprisingly found that panels according to the present invention may show an improved delamination resistance with maintained, if not improved, $E_{abs}$. It was furthermore observed that during its utilization in hot environments, the anti-ballistic properties of the panel of the invention are hardly affected.

The invention further relates to a method for the preparation of the composite panel according to the present invention, the method comprising:
(a) providing at least one layer containing at least one tape comprising a thermoplastic polymer selected from the group consisting of polyolefins, polyesters, polyvinyl alcohols, polyacrylonitriles, polyamides or polyketone with a tensile strength of at least 1.2 GPa and an areal density of between 5 and 250 g/m², and a plastomer;
(b) stacking the at least one layer and the plastomer to form an assembly thereof;
(c) compressing the thus formed assembly at a pressure of at least 0.1 MPa and a temperature between 10° C. above the melting temperature of the plastomer and the melting temperature of the tape, whereby in the assembly, said plastomer is in contact with said layer, wherein the plastomer is a random copolymer of ethylene or propylene and one or more $C_2$ to $C_{12}$ α-olefin co-monomers and wherein said plastomer has a density as measured according to ISO1183 of between 860 and 930 kg/m³; whereby the amount of the plastomer in contact with one side of the at least one layer is between 0.2 and 15 g/m².

Compressing of the assembly may suitably be carried out in a hydraulic press. Compressing is intended to mean that the layers and the adhesive in the assembly are relatively firmly attached to one another to form one consolidated unit. The temperature during consolidating generally is controlled through the temperature of the press. A minimum temperature generally is chosen such that the plastomer is heated above its peak melting point and a reasonable speed of consolidation is obtained. In this respect 60° C. is a suitable lower temperature limit, preferably this lower limit is at least 80° C., more preferably at least 100° C., even more preferably at least 120° C., most preferably at least 140° C. According to the invention, the temperature at which the assembly is consolidated under pressure should not deviate appreciably from the melting temperature of the tape. In a preferred embodiment of the method the temperature is not more than 20° C. below the melting temperature of the tape, preferably not more than 10° C. below the melting point of the tape. Surprisingly, at temperatures according to the preferred ranges, improved ballistic properties of the panel according to the invention are observed.

Determination of the melting temperature of the tape is a technique generally know to the skilled person and includes DSC measurement with a heating rate of 10° C./min whereby the temperature at the maximum of the melting peak is defined as the melting temperature. In case the tape does not exhibit a clear melting temperature, the temperature at which the tape starts to lose its mechanical properties should be read instead of melting temperature. This can be determined by methods know to the skilled man including measuring stiffness against temperature.

Further according to the invention, the pressure for consolidating the polymeric film layers, to achieve good antiballistic properties, should be at least 0.1 MPa. A preferred method is characterized in that the pressure is at least 1 MPa or better is at least 10 MPa, more preferred at least 20 MPa.

The optimum time for consolidation generally ranges from 5 to 120 minutes, depending on conditions such as temperature, pressure and part thickness and can be verified through routine experimentation. Preferably, in order to obtain high antiballistic performance, cooling after consolidation at high temperature is carried out under pressure as well. Pressure is preferably maintained at least until the temperature is sufficiently low to prevent relaxation of the polymer. Typically such temperature is at most 80° C.

In a further preferred embodiment of the method of the invention, a vacuum is applied to the assembly before, during or after compressing said assembly. Preferably such vacuum is applied before or during compressing. Such vacuum may suitably be applied through a vacuum chamber or through the use of a vacuum bag. This measure has proven to be beneficial in increasing areal density of the produced panel. The applied vacuum preferably reduces the environmental pressure with at least 0.05 MPa, more preferably with at least 0.08 MPa, even more preferably with at least 0.09 MPa and most preferably with at least 0.095 MPa.

In a preferred embodiment of the process according to the invention, in step (a) the plastomer is provided in the form of a powder, a film, a tape, a dispersion, a solution, an emulsion, a hot melt or a carrier sheet comprising said plastomer. The optimal way of providing the plastomer to the process of the present invention may depend on the way the process is carried out and the envisioned panel properties. Providing the plastomer to the processes in the form of a film or carrier sheet comprising the plastomer may have the advantage of an easier handling and stacking operation and an accurate amount of plastomer in contact with the layer comprising the tape. Providing the plastomer in the form of a powder, a hot melt, a dispersion or an emulsion comprising the plastomer may be suitable for an automated operation and/or may allow the amounts of adhesive in contact with the layer containing a tape to be chosen more freely.

In a preferred process according to the invention, in step (a) the at least one layer and the plastomer are provided to the process in the form of a sheet comprising the at least one layer and the plastomer in contact with said layer. Accordingly, the sheet allows to provide both (i) the layer comprising the at least one tape and (ii) the plastomer to the process in a single operation. Hence, the assembly stacked according to the process of the present invention can be prepared by solely stacking said sheets. Providing a sheet according to the present embodiment represents a substantial simplification of the stacking and compaction operation. Next to a simplified panel production process, it takes away the risk that no plastomer, insufficient or excessive amounts of plastomer are provided to the stacking operation.

Hence, the invention further relates to a sheet, suitable to provide the layer and plastomer for the method according to the present invention, wherein the sheet comprises at least one layer containing at least one tape comprising a thermoplastic polymer selected from the group consisting of polyolefins, polyesters, polyvinyl alcohols, polyacrylonitriles, polyamides or polyketone, wherein the tape has a tensile strength of at least 1.2 GPa and an areal density of between 5 and 250 g/m$^2$, and comprising plastomer in contact with said layer, whereby the amount of the plastomer is between 0.2 and 15 g/m$^2$, characterized in that said plastomer is a random copolymer of ethylene or propylene and one or more $C_2$ to $C_{12}$ α-olefin co-monomers and wherein said plastomer has a density as measured according to ISO1183 of between 860 and 930 kg/m$^3$.

Said sheet is herein understood to be an intermediate product of the composite panel of the invention. The sheet alone or stacked with other sheets according to the invention and processed according to the process of the invention will provide a composite panel according to the invention.

Accordingly, the present invention also relates to the use of the sheet according to the invention in the manufacture of antiballistic articles.

In a preferred embodiment, the sheet comprises at least 2 layers of a plurality of unidirectional aligned tapes or at least one layer of a plurality woven tapes. Preferably, the sheet consists of 2 layers of a plurality of unidirectional aligned tapes or one layer of a plurality of woven tapes. Preferably the direction of orientation of the unidirectional aligned tapes in 2 adjacent layers differ by an angle β, whereby β is preferably between 5 and 90°, more preferably between 45 and 90° and most preferably between 75 and 90°.

The method to prepare the sheet according to the invention is not limited to any specific process. Such sheets may be produced by providing at least one layer containing at least one tape with a tensile strength of at least 1.2 GPa and an areal density of between 5 and 250 g/m$^2$, and a plastomer and (b) stacking the at least one layer and the plastomer to form a sheet according to the invention. Optionally the process may further comprise a heating and/or compression step. Said heating and/or compressing step may increase the contact between the plastomer and said layer and may be applied at different moments of the production process of the sheet. The temperature during compression generally is controlled through the temperature of the rolls or the press. A minimum temperature generally is chosen such that the plastomer is heated above its melting point. In this respect 60° C. is a suitable lower temperature limit, preferably this lower limit is at least 80° C., more preferably at least 100° C. Applying a heating and/or compression step has the advantage that the sheet shows improved integrity, i.e. the sheet is less prone to disintegrate into its individual components.

In a preferred method, the sheet may be produced by providing at least one layer comprising at least one tape and the plastomer wherein the tape comprised in the layer is a composite tape comprising a tape comprising a thermoplastic polymer selected from the group consisting of polyolefins, polyesters, polyvinyl alcohols, polyacrylonitriles, polyamides or polyketone, with a tensile strength of at least 1.2 GPa and an areal density of between 5 and 250 g/m$^2$, and an plastomer in contact with said tape, whereby the amount of the plastomer is between 0.2 and 15 g/m$^2$, characterized in that the plastomer is a random copolymer of ethylene and one or more $C_3$ to $C_{12}$ α-olefin co-monomers, said copolymer having a density as measured according to ISO1183 of between 860 and 930 kg/m$^3$. Accordingly, the composite tape allows to provide both (i) the tape and (ii) the plastomer to the process in a single operation. Hence, the at least one layer comprised in the sheet of the present invention can be prepared by solely using said composite tape. Providing a composite tape according to above embodiment represents a substantial simplification of the manufacturing process of the sheet. Next to a simplified sheet production process, the composite tape takes away the risk that no plastomer, insufficient or excessive amounts of plastomer are provided to the stacking operation. In case the sheet comprises overlaps of tapes, e.g. resulting form a woven layer or longitudinal overlap of unidirectional aligned tapes, plastomer is present in-between the overlap of the tapes providing further integrity of the sheets. Surprisingly, even the composite panel according to the invention comprising said composite tapes shows further improved antiballistic performance.

Hence, the invention further relates to a composite tape suitable as a tape and plastomer for the sheet and the composite panel according to the invention, wherein the composite tape comprises a tape comprising a thermoplastic polymer selected from the group consisting of polyolefins, polyesters, polyvinyl alcohols, polyacrylonitriles, polyamides or polyketone, with a tensile strength of at least 1.2 GPa and an areal density of between 5 and 250 g/m$^2$, and an plastomer in contact with said tape, whereby the amount of the plastomer is between 0.2 and 15 g/m$^2$, characterized in that the plastomer is a random copolymer of ethylene or propylene and one or more $C_2$ to $C_{12}$ α-olefin co-monomers, said copolymer having a density as measured according to ISO1183 of between 860 and 930 kg/m$^3$. The invention also relates to the use of said composite tape in the manufacture of antiballistic articles, e.g. antiballistic sheets or antiballistic panels. The method to prepare the composite tape according to the invention is not limited to any specific process. Such tapes may be produced by using the methods disclosed above and a applying a plastomer in the form of a powder, a film, a tape, a dispersion, a solution, an emulsion, a hot melt or a carrier sheet comprising said plastomer. Optionally the method may further comprise a heating and/or compression step as discussed for the production of a sheet according to the invention above.

An alternative method to prepare the composite tape according to the invention is to provide the plastomer before or during the manufacturing of the tape, resulting in a composite tape according to the invention whereby the tape comprises the plastomer in an amount of between 0.2 and 15 g/m$^2$.

An example of such a process is that a polymeric powder and the plastomer is fed between a combination of endless belts, compression-moulding the mixture of polymeric powder and plastomer at a temperature below the melting point of the polymeric powder and rolling the resultant compression-moulded polymer mixture followed by drawing. If desired, prior to feeding and compression-moulding the polymer powder, the polymer powder may be further mixed with a suitable liquid organic compound having a boiling point higher than the melting point of said polymer. Compression moulding may also be carried out by temporarily retaining the polymer powder between the endless belts while conveying them.

The composite panels of the present invention are particularly advantageous over previously known composite panels as they provide at least the same level of protection as the known articles at a significantly lower weight, or an improved ballistic performance at equal weight compared with the known panels. Employed plastomer is inexpensive and the manufacturing process is relatively short and thus cost effective. Since different polymers may be used to produce the composite panels of the invention, properties may be optimized according to the particular application. Besides ballistic resistance, properties include for instance heat stability, shelf-life, deformation resistance, bonding capacity to other material sheets, formability, and so on. The invention further relates to a ballistic resistant article, an armor, a vehicle, a building, a radome or a building component comprising the composite panel of the invention and especially the use of the composite panel of the invention in a ballistic resistant article.

Methods of Measuring

Areal density (AD) of a panel or sheet was determined by measuring the weight of a sample of preferably 0.4 m×0.4 m with an error of 0.1 g. The areal density of a tape was determined by measuring the weight of a sample of preferably 1.0 m×0.1 m with an error of 0.1 g.

Intrinsic Viscosity (IV) is determined according to ASTM-D1601/2004 at 135° C. in decalin, the dissolution time being 16 hours, with DBPC as anti-oxidant in an amount of 2 g/l solution, by extrapolating the viscosity as measured at different concentrations to zero concentration. There are several empirical relations between IV and Mw, but such relation is highly dependent on molar mass distribution. Based on the equation $M_w = 5.37 \times 10^4 [IV]^{1.37}$ (see EP 0504954 A1) an IV of 4.5 dl/g would be equivalent to a $M_w$ of about 422 kg/mol.

Side chains in a polyethylene or UHMWPE sample is determined by FTIR on a 2 mm thick compression molded film by quantifying the absorption at 1375 $cm^{-1}$ using a calibration curve based on NMR measurements (as in e.g. EP 0 269 151)

Tensile properties, i.e. strength and modulus, of fibers were determined on multifilament yarns as specified in ASTM D885M, using a nominal gauge length of the fibre of 500 mm, a crosshead speed of 50%/min and Instron 2714 clamps, of type Fibre Grip D5618C. For calculation of the strength, the tensile forces measured are divided by the titre, as determined by weighing 10 meter of fibre; values in GPa for are calculated assuming the natural density of the polymer, e.g. for UHMWPE is 0.97 $g/cm^3$.

The tensile properties of tapes and films: tensile strength and tensile modulus are defined and determined at 20° C. on tapes (if applicable obtained by slitting) of a width of 2 mm as specified in ASTM D882, using a nominal gauge length of the tape of 131 mm, a crosshead speed of 50 mm/min.

The melting temperature (also referred to as melting point) of a polyolefin tape is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only. The tapes were hand-winded around a support to simulate restrained conditions.

The DSC peak melting point of the plastomer is measured according to ASTM D3418

The density of the plastomer is measured according to ISO 1183.

Ballistic performance was measured by subjecting the panels to shooting tests performed with the further indicated ammunition. The first shot was fired at a projectile speed ($V_{50}$) at which it is anticipated that 50% of the shots would be stopped. The actual bullet speed was measured at a short distance before impact. If a stop was obtained, the next shot was fired at an anticipated speed being 10% higher than the previous speed. If a perforation occurred, the next shot was fired at an anticipated speed 10% lower than the previous speed. The result for the experimentally obtained V50 value was the average of the two highest stops and the two lowest perforations. The kinetic energy of the bullet at $V_{50}$ ($E_{kin} = \frac{1}{2} \cdot m \cdot V_{50}^2$) wherein m is the mass of the projectile, was divided by the areal density of the armor to obtain a so-called $E_{abs}$ value. $E_{abs}$ reflects the stopping power of the armor relative to its weight/thickness thereof. The higher the $E_{abs}$ the better the armor is.

For

The speed of the projectile was measured with a pair of Drello Infrared (IR) light screen Type LS19i3 positioned perpendicular on the path of the projectile. At the instant when a projectile passes through the first light screen a first electric pulse will be produced due to the disturbance of the IR beam. A second electric pulse will be produced when the projectile passes through the second light screen. Recording the moments in time when the first and the second electric pulses occur, and knowing the distance between the light screed the speed of the projectile can be immediately determined.

EXAMPLES AND COMPARATIVE EXPERIMENT

Example 1

40 bobbins of Dyneema® SK76 1760 dtex yarn, were unwound from a tension controlled creel. To guarantee the right yarn density for fusion, the distance between yarns was controlled by feeding the yarns into a reed. Subsequently the yarns were spread to form a gap-less bed of filaments with a width of 153 mm by feeding the yarns over a spreading unit. The spread yarns are then fed into a calander. The rolls of the calander had a diameter of 400 mm and the applied line pressure was 2000 N/cm. The line operated at a line speed of 8 m/min and at a roll surface temperature of 154° C. In the calander the yarns were consolidated into a tape. The tape was removed from the calander by the first rollerstand. A powder scattering unit was placed between the calander and the first roller-stand applying 4.4 wt % of Exact 8210 powder to the upper surface of the tape. The Exact powder had a particle size with >98 wt % of the particles being greater than 500 micron and no particles greater than 2000 micron. The tape was pulled into an oven by a second roller-stand. The oven was set to a temperature of 153° C. By means of the speed of the roller-stands, the draw-ratio of the tape in the oven was set to 1.3. Finally the tape was wound on a core.

A composite tape comprising 1.5 $g/m^2$ Exact 8210 with a width of 140 mm and an areal density of 35 μm was obtained. The tape had a tenacity of 35.4 cN/dTex and a modulus of 1387 cN/dTex.

The tape was cut into 400 mm long strips. 3 strips were unidirectional aligned to form the first layer of a sheet. The second layer of the first sheet was placed by posing 3 more strips unidirectional aligned on top of the first layer but with a tape orientation perpendicular to the tape orientation of the first layer. Multiple sheets were stacked to form an assembly, making sure the alternating 0-90 direction of the tape layers was maintained. The assembly of sheets was vacuum sealed in a polyethylene bag and pressed into a panel. The panels were pressed at 30 MPa and 145° C. for 40 minutes followed by a cooling period of 20 min at 30 MPa.

The tape was processed into 2 panels of 3 and 16 Kg/m² respectively. For the 3 Kg/m² panel a total of 84 layers were used. The panel of 16 Kg/m² contained 456 layers of unidirectional aligned tapes. The 3 Kg/m² panel was shot with a 9 mm parabellum (FMJ) bullet and the 16 Kg/m² panel was shot with a AK47 bullet. All panels of example 1 showed minimum delamination during the ballistic tests. Results are listed in the table below.

Comparative Experiment A 2 panels have been produced by a process identical to the process according to Example 1 with the only difference that the addition of Exact 8210 powder was omitted. The 3 and 16 Kg/m² panels contained 88 and 476 layers of tape respectively. Both panels showed substantial delamination during ballistic testing. Results of the ballistic tests are reported in the table below.

TABLE 1

|  | EXACT 8210 content [%] | $E_{abs}$ 9 mm [Jm²/kg] | $E_{abs}$ AK47 [Jm²/kg] |
| --- | --- | --- | --- |
| Example 1 | 4.4 | 356 | 235 |
| Comparative Experiment A | — | 338 | 229 |

Example 2

An ultra high molecular weight polyethylene tape was manufactured according to the process described in U.S. Pat. No. 5,091,133. A tape with the following properties was obtained: Linear density of 43300 dtex; Tenacity: 16.5 cN/dtex; Modulus: 1125 cN/dtex; Width: 100 mm; Areal density: 42 g/m². The tape was woven into a fabric with a plain weave pattern out of which 500 by 500 mm² square woven layers were cut out with the edges substantially parallel to the direction of orientation of the tapes. The woven layers were stacked to form an assembly whereby each woven layer was sprinkled with 2.2 gr of Exact 8210 powder (equivalent to 8.8 g/m²) before the next woven layer was placed on top to an assembly with a total AD of 6.8 kg/m². The total number of woven layers was 73. The Exact powder had a particle size with >98 wt % of the particles being greater than 100 micron, an average particle size of 400 micron and no particles greater than 750 micron.

The assembly of woven layers and Exact powder was pressed into a panel with a total areal density of 6.8 kg/m². Here for the assembly was first subjected to a degassing cycle of 5 minutes at 2 MPa and 130° C., followed by a pressing cycle of 50 minutes at 16.5 MPa and 133° C. and a cooling cycle of 20 minutes at 16.5 MPa.

Each pressed panel was cut into 9 smaller panels with dimensions of 136×136 mm. The panels were than subjected to a 1.1 g FSP V50 test. Furthermore one panel was placed in an oven at 90° C. for 48 hours prior to testing and subjected to the V50 test under hot conditions immediately upon removal from the oven. All panels of example 2 showed minimum delamination during the ballistic tests. The results of the ballistic test are shown in table 2.

Comparative Experiment B

Panels have been produced by a process identical to the process according to Example 2 with the only difference that instead of Exact 8210 powder an LDPE foil of a thickness of 7 μm (Stamylex from Hyplast) was placed on top of each woven layer. The results of the ballistic test are shown in table 2.

TABLE 2

|  | Adhesive | V50 (m/s) | V50 at 90° C. |
| --- | --- | --- | --- |
| Example 2 | Exact 8210 | 615 | 610 |
| Comparative Experiment B | LDPE foil | 574 | 585 |

The invention claimed is:

1. A composite panel comprising at least four tape layers, wherein
   each of the tape layers comprises at least one tape comprising a thermoplastic polymer selected from the group consisting of polyolefins, polyesters, polyvinyl alcohols, polyacrylonitriles, polyamides and polyketone, wherein the at least one tape has a tensile strength of at least 1.2 GPa and an areal density of between 5 and 250 g/m², and
   between 0.2 and 15 g/m² of an adhesive in contact with the at least one tape layer, wherein
   the adhesive is a plastomer and wherein the plastomer is a random copolymer of ethylene or propylene and one or more $C_2$ to $C_{12}$ α-olefin co-monomers, and wherein the said plastomer has a density as measured according to ISO1183 of between 860 and 930 kg/m³, and wherein
   the composite panel has an areal density between 0.25 Kg/m² and 250 Kg/m².

2. The composite panel of claim 1, wherein the at least one tape comprises a polyolefin.

3. The composite panel of claim 1, wherein the at least one tape in the tape layers is unidirectionally aligned or woven.

4. The composite panel of claim 1, wherein the tape layers comprise a plurality of unidirectionally aligned tapes, wherein a direction of orientation of the tapes in one layer comprising the unidirectionally aligned tapes is at an angle β relative to a direction of orientation of the tapes in an adjacent layer, and wherein β is between 5 and 90°.

5. The composite panel of claim 1, wherein the random copolymer in the panel is present in an amount of less than 15 wt %.

6. The composite panel of claim 1, wherein the panel comprises at least eight tape layers, and wherein each of the tape layers comprises the at least one tape.

7. The composite panel of claim 1, wherein the panel has an areal density between 0.5 Kg/m² and 100 Kg/m².

8. The composite panel of claim 1, wherein the adhesive is heterogeneously distributed over the at least one tape layer so as to establish areas of the at least one tape layer having no adhesive.

9. The composite panel of claim 8, wherein the adhesive layer is a web-like structure.

10. The composite panel of claim 1, wherein the adhesive is inhomogeneously in contact with the at least one tape layer so as to establish areas having respective lower and higher amounts of the adhesive.

11. A product which comprises the composite panel of claim 1, wherein the product is selected from the group consisting of ballistic resistant articles, armor, vehicles, buildings, radomes and building components.

12. A ballistic resistant article which comprises the composite panel according to claim 1.

13. A method of making the composite panel of claim 1, the method comprising:
(a) providing the at least four tape layers, wherein each of the tape layers comprises at least one tape comprising a thermoplastic polymer selected from the group consisting of polyolefins, polyesters, polyvinyl alcohols, polyacrylonitriles, polyamides and polyketone, wherein the tape has a tensile strength of at least 1.2 GPa and an areal density of between 5 and 250 $g/m^2$, and a plastomer
(b) stacking the at least one layer and the plastomer to form an assembly thereof;
(c) compressing the thus formed assembly at a pressure of at least 0.1 MPa and a temperature between 10° C. above the melting temperature of the plastomer and the melting temperature of the tape, wherein
the plastomer in the assembly is in contact with the at least one layer, and wherein the plastomer is a random copolymer of ethylene or propylene and one or more $C_2$ to $C_{12}$ α-olefin co-monomers, and wherein said plastomer has a density as measured according to ISO1183 of between 860 and 930 $kg/m^3$; and wherein the plastomer in contact with one side of the at least one layer is present in an amount between 0.2 and 15 $g/m^2$.

14. The method according to claim 13, wherein the plastomer provided in step (a) is in a form of a powder, a film, a tape, a dispersion, a solution, an emulsion, a hot melt, or a carrier sheet comprising the plastomer.

15. The method according to claim 13, wherein the at least four tape layers and the plastomer provided in step (a) of the process are in a form of a sheet comprising the at least one layer and the plastomer in contact with the at least one layer.

16. The method according to claim 15, wherein step (a) comprises providing a sheet comprised of the at least four tape layers and the plastomer.

17. The method of claim 16, wherein the at least four tape layers comprise a plurality of unidirectionally aligned tapes or at least one layer of a plurality of woven tapes.

18. The method according to claim 16, wherein the sheet is a composite tape comprised of the at least one tape and the plastomer.

* * * * *